United States Patent [19]
Shimoda

[11] Patent Number: 5,210,861
[45] Date of Patent: May 11, 1993

[54] METHOD FOR VERIFYING A SERIALIZING FUNCTION IN A SYSTEM INCLUDING PROCESSORS AND A TEST SYSTEM INCLUDING PROCESSORS FOR VERIFYING THE SERIALIZING FUNCTION

[75] Inventor: Akira Shimoda, Kanagawa, Japan

[73] Assignee: Fujitsu Limited, Kawasaki, Japan

[21] Appl. No.: 530,327

[22] Filed: May 30, 1990

[30] Foreign Application Priority Data

May 30, 1989 [JP] Japan .................... 01-136524

[51] Int. Cl.$^5$ .................................. G06F 11/00
[52] U.S. Cl. ............................. 395/575; 395/375;
364/242.9; 364/266.1; 364/269; 364/712;
364/DIG. 1; 364/931.48; 364/950.3;
364/944.6; 364/DIG. 2
[58] Field of Search ............ 364/200, 900, 228.1,
364/242.91, 265.6, 226.1, 267 A, 267.7, 269,
271, 271.3, 271.2, 931.43, 931.48, 950, 950.3,
950.4, 944.6, 445.4, 945.7; 371/15.1, 16.1

[56] References Cited
U.S. PATENT DOCUMENTS
4,063,220 12/1977 Metcalfe .................. 370/85.2 X
4,975,833 12/1990 Jinzaki ........................ 395/425

*Primary Examiner*—Robert W. Beausoliel
*Assistant Examiner*—Ly V. Hua
*Attorney, Agent, or Firm*—Staas and Halsey

[57] ABSTRACT

A method for verifying a serializing function in a system including a plurality of processors and a test system including processors for verifying the serializing function. Each processor executes a verifying processing including the steps of: synchronizing an execution status of its own processor with an execution status of another processor; delaying an initiation of a next execution for a predetermined changeable period; issuing and executing a serializing instruction indicating a set of data read and write processings; and verifying whether the serializing instruction is normally executed or not. By controlling a timing of the execution of the serializing instruction at random between each processor, it is possible to verify normality of the serializing function satisfactorily and in a short time, while specifying whether cause for a fault occurring in the entire system is due to the serializing function or not.

12 Claims, 7 Drawing Sheets

METHOD FOR VERIFYING A SERIALIZING FUNCTION IN A SYSTEM INCLUDING PROCESSORS AND A TEST SYSTEM INCLUDING PROCESSORS FOR VERIFYING THE SERIALIZING FUNCTION

BACKGROUND OF THE INVENTION

1. Field of the Invention

The present invention relates to a technique of verifying a serializing function in a system including a plurality of processors or central processing units (CPUs) for taking access to a common memory or storage to execute multiprocessing.

The serializing function verification according to the present invention is carried out when the system is unfolded for its forwarding, or when the system is rebuilt or under maintenance.

2. Description of the Related Art

In a multiprocessor (multi-CPU) system for executing the above multiprocessing, a serializing instruction such as a test and set (TS) instruction is frequently used for synchronization of processings, control of competition for access to an identical storage area, or the like.

The TS instruction is composed of a series of processings of reading flags, judging them and setting them based on a result of the judgement, or the like. Since the TS instruction needs two memory cycles, the system is provided with a serializing function (hardware) of inhibiting access to the identical area by another processor (CPU) during execution of the TS instruction, so that processing based on the TS instruction is ensured.

To verify whether the serializing function normally works or not, it is necessary to execute serializing instructions at various timings and cause accessing operations by CPUs to compete with each other. In practice, however, it is very difficult to set the timings between the CPUs and confirm them. In this regard, in the prior art, the serializing function has been verified at a constant timing. Accordingly, the prior art has a drawback in that it is impossible to satisfactorily ensure normality of the serializing function.

In recent years, a multi-CPU system has increasingly come into wide use and thus a technique of perfectly ensuring normality of the serializing function has been strongly demanded.

SUMMARY OF THE INVENTION

An object of the present invention is to provide a method for verifying a serializing function and a test system therefor which can satisfactorily ensure normality of the serializing function.

Another object of the present invention is to provide a method and a test system which can verify the serializing function in a short time and, when a fault occurs in the entire system, contribute to specifying whether cause for the fault is due to the serializing function or not.

According to one aspect of the present invention, there is provided a method for verifying a serializing function in a system in which data of predetermined areas in a common storage are transferred to an internal storage provided in each of a plurality of processors and access to the data is taken, each processor executing a verifying processing including: a first step of synchronizing an execution status of its own processor with an execution status of another processor; a second step of delaying an initiation of a next execution for a predetermined changeable period; a third step of issuing and executing a serializing instruction indicating a set of data read and write processings; and a fourth step of verifying whether the serializing instruction is normally executed or not, whereby a timing of the execution of the serializing instruction is controlled at random between each processor to verify normality of the serializing function.

Also, the method may further comprise a fifth step, after the fourth step, of initializing the corresponding internal storage and the common storage to control execution of each step from the first step, thereby controlling the timing of the execution of the serializing instruction repeatedly between each processor.

Also, the third step may comprise the steps of executing the serializing instruction to read a first area set for its own processor and store a given data in the first area, then reading a second area set for the other processor to discriminate a write status of data by the other processor, and repeatedly reading the second area to discriminate the write status where the second area is in a non-write status, and the fourth step may comprise the steps of monitoring the execution status of the other processor and, where the other processor is still executing the discrimination operation after a lapse of predetermined time, indicating occurrence of an error.

Furthermore, the fifth step may include the step of making the corresponding internal storage full of data other than data corresponding to areas for use of verification of the serializing function.

Also, according to another aspect of the present invention, there is provided a test system including a plurality of processors for verifying a serializing function, in which data of predetermined areas in a common storage are transferred to an internal storage provided in each of the processors and access to the data is taken, each processor including: a first unit for synchronizing an execution status of its own processor with an execution status of another processor; a second unit for delaying an initiation of a next execution for a predetermined changeable period after completion of the synchronizing processing; a third unit for issuing and executing a serializing instruction indicating a set of data read and write processings; and a fourth unit for verifying whether the serializing instruction is normally executed or not, whereby the test system controls a timing of the execution of the serializing instruction at random between each processor to verify normality of the serializing function.

The test system according to the present aspect may be suitably given various limitations in the same manner as the method according to the above aspect.

BRIEF DESCRIPTION OF THE DRAWINGS

Other objects and features of the present invention will be described hereinafter in detail by way of preferred embodiments with reference to the accompanying drawings, in which.

DESCRIPTION OF THE PREFERRED EMBODIMENTS

For a better understanding of the preferred embodiment according to the present invention, the problems in the prior art will be explained with reference to FIG. 1.

Figure 1:
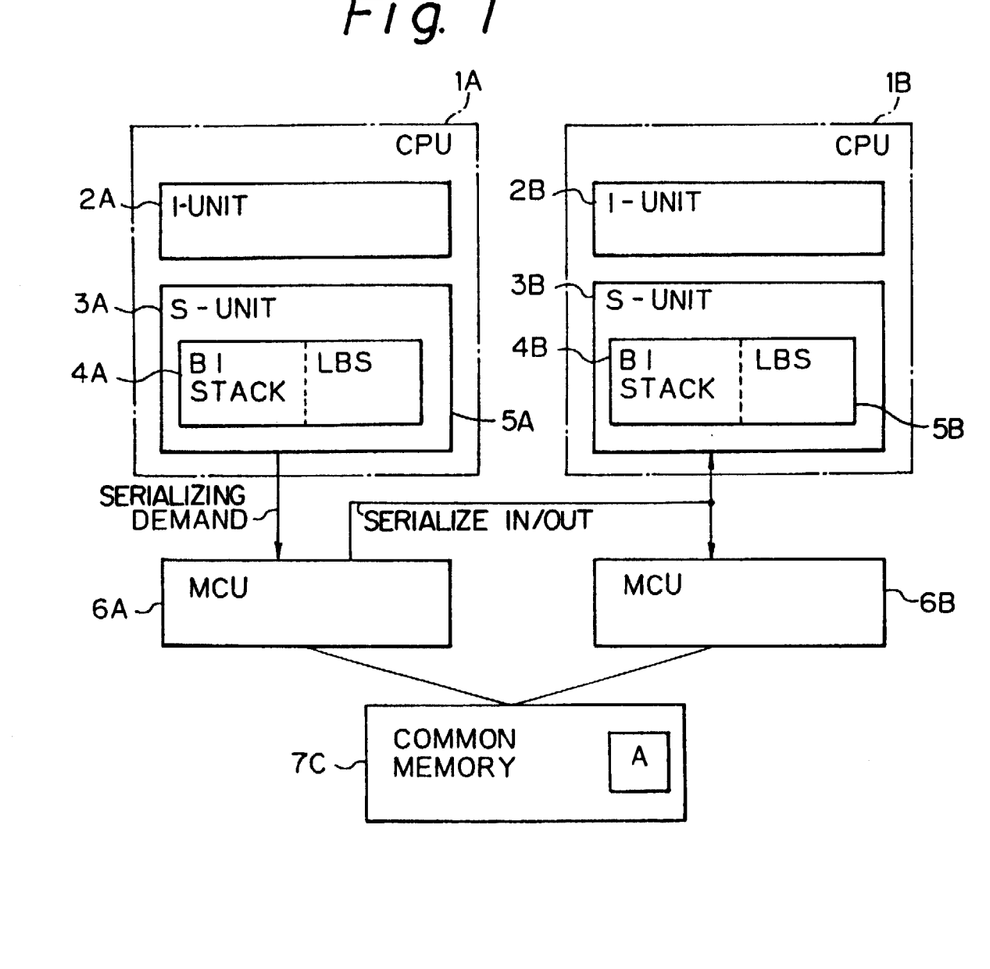
FIG. 1 is a block diagram illustrating a constitution of a multi-CPU system.

FIG. 1 illustrates a constitution of a multi-CPU system, which is an object for verification of a serializing function.

The illustration shows a duplex system in which CPUs 1A and 1B take access to a common memory 7C via memory control units (MCUs) 6A and 6B, respectively. The CPUs 1A and 1B include instruction units (I-UNITs) 2A and 2B, and storage units (S-UNITs) 3A and 3B, respectively. The S-UNIT 3A (3B) constitutes a cache memory system and includes a buffer invalidation stack (BI STACK) 4A (4B) for storing invalidation data and an internal memory or local buffer storage (LBS) 5A (5B) for storing part of data transferred from the common memory 7C. Where data designated by the I-UNIT 2A (2B) is present in the storage 5A (5B), the S-UNIT 3A (3B) takes access to the storage 5A (5B), and where the data is not present, the S-UNIT 3A (3B) directly takes access to the common memory 7C and stores the data in the storage 5A (5B). Note, when data in the storage 5A (5B) is renewed, invalidation of the corresponding address is informed to another CPU 1B (1A) for prevention of non-identity of data between the storage 5A (5B) and the common memory 7C.

In the above constitution, when the CPU 1A (1B) occupies a certain memory area to renew data thereof, it brings a corresponding flag (area A) in the common memory 7C to an ON state, using a TS instruction, and informs the other CPU 1B (1A) of the status of the flag. By the TS instruction, a series of processings are executed of reading the flag (area A), judging it and setting a condition code based on the judgement, or bringing the flag to an ON state where the flag is OFF. Where the other CPU takes access to the area A, for example, by a TS instruction, during execution of the series of processings by the one CPU, a case occurs in that both of the CPUs are involved in the access operation, so that it becomes impossible to control competition for access to the area A.

To cope with the disadvantage, a serializing processing is executed by a hardware organization during execution of the TS instruction.

First, when a TS instruction is decoded by the CPU 1A, a serializing demand (signal) is sent to the MCU 6A. The MCU 6A sends a SERIALIZE IN signal together with an address corresponding to the area A to the CPU 1B. Note, the SERIALIZE IN signal indicates an initiation of the serializing operation. Upon receipt of the SERIALIZE IN signal, the CPU 1B stores the address of the area A in the stack 4B and inhibits access to the area A based on the serializing instruction such as a TS instruction, a compare and swap (CS) instruction, or the like.

When the TS instruction is executed and the corresponding flag in the common memory 7C is renewed, the MCU 6A issues a SERIALIZE OUT signal to the CPU 1B. Note, the SERIALIZE OUT signal indicates a termination of the serializing operation. Upon receipt of the SERIALIZE OUT signal, the CPU 1B refers to the content of the stack 4B, i.e., address of the area A, to invalidate the corresponding data in the storage 5B, and starts execution of the inhibited instruction. At this time, since the corresponding data in the storage 5B is invalidated, the CPU 1B takes access to the common memory 7C and thus can read a status of the renewed flag.

Verification of the above serializing function is carried out by causing the execution of the TS instruction by the one CPU and the reading operation by the other CPU to compete with each other and, based on the timing of the competition and the status of the read flag, determining whether the serializing instruction is normally executed or not. In this case, to ensure normality of the serializing function, it is necessary to verify the serializing function at various timings.

However, it is very difficult to run each CPU in the multi-CPU system at a respective theoretical timing. It is also difficult to confirm the timing. In this regard, the prior art verification of the serializing function has been carried out only at a certain constant timing. This results in a problem in that it is impossible to perfectly ensure the normality of the serializing function.

Also, since the prior art multi-CPU system is simply run by an operating system without a special program for verifying the serializing function, a drawback occurs in that, where a fault occurs in the entire system, it is very difficult to exactly specify whether cause for the fault is due to the serializing function or not. In this regard, a disadvantage also occurs in that it is impossible to verify the serializing function in a short time.

Figure 2A:
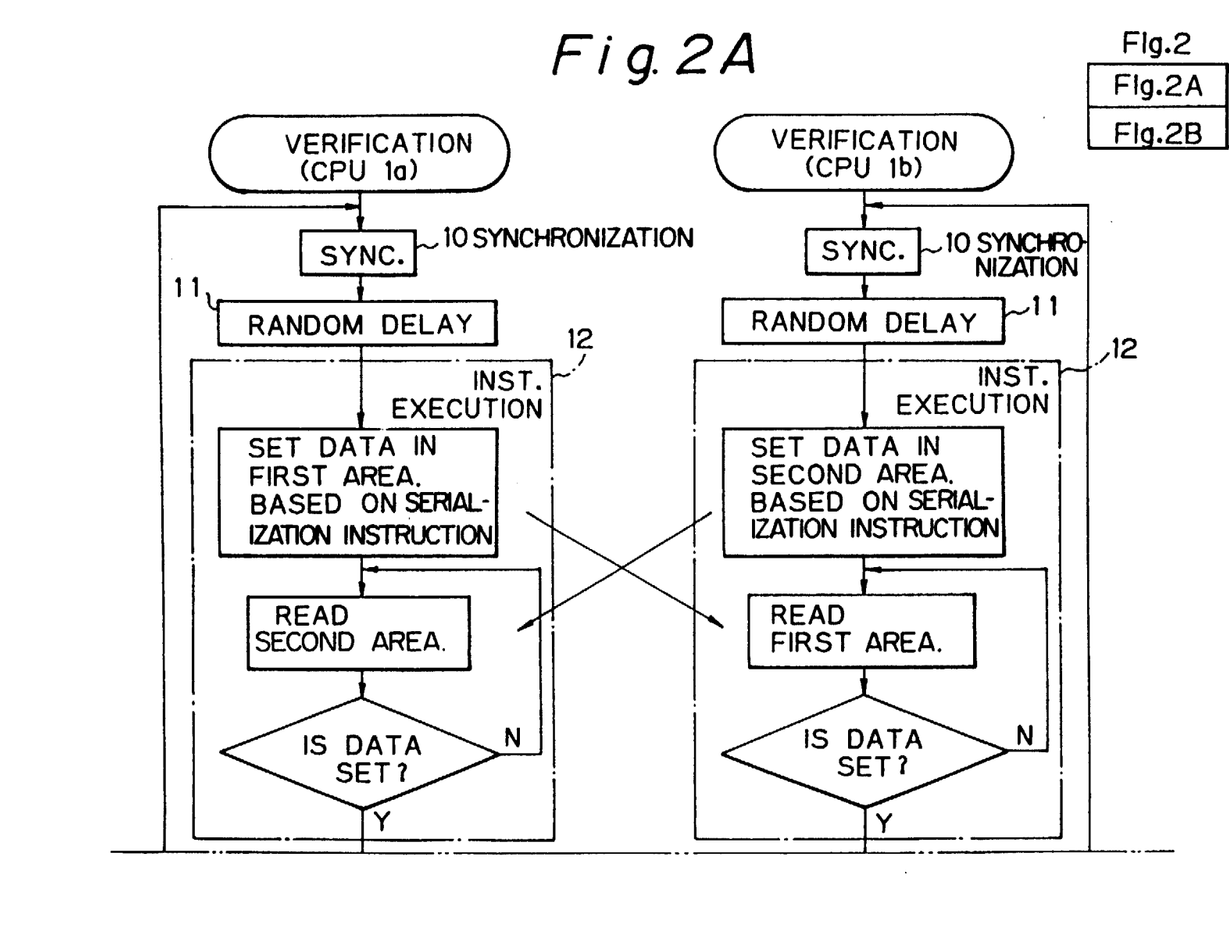
FIGS. 2A and 2B are flow charts for explaining the fundamental approach to the serializing function verification according to the present invention.
Figure 2B:
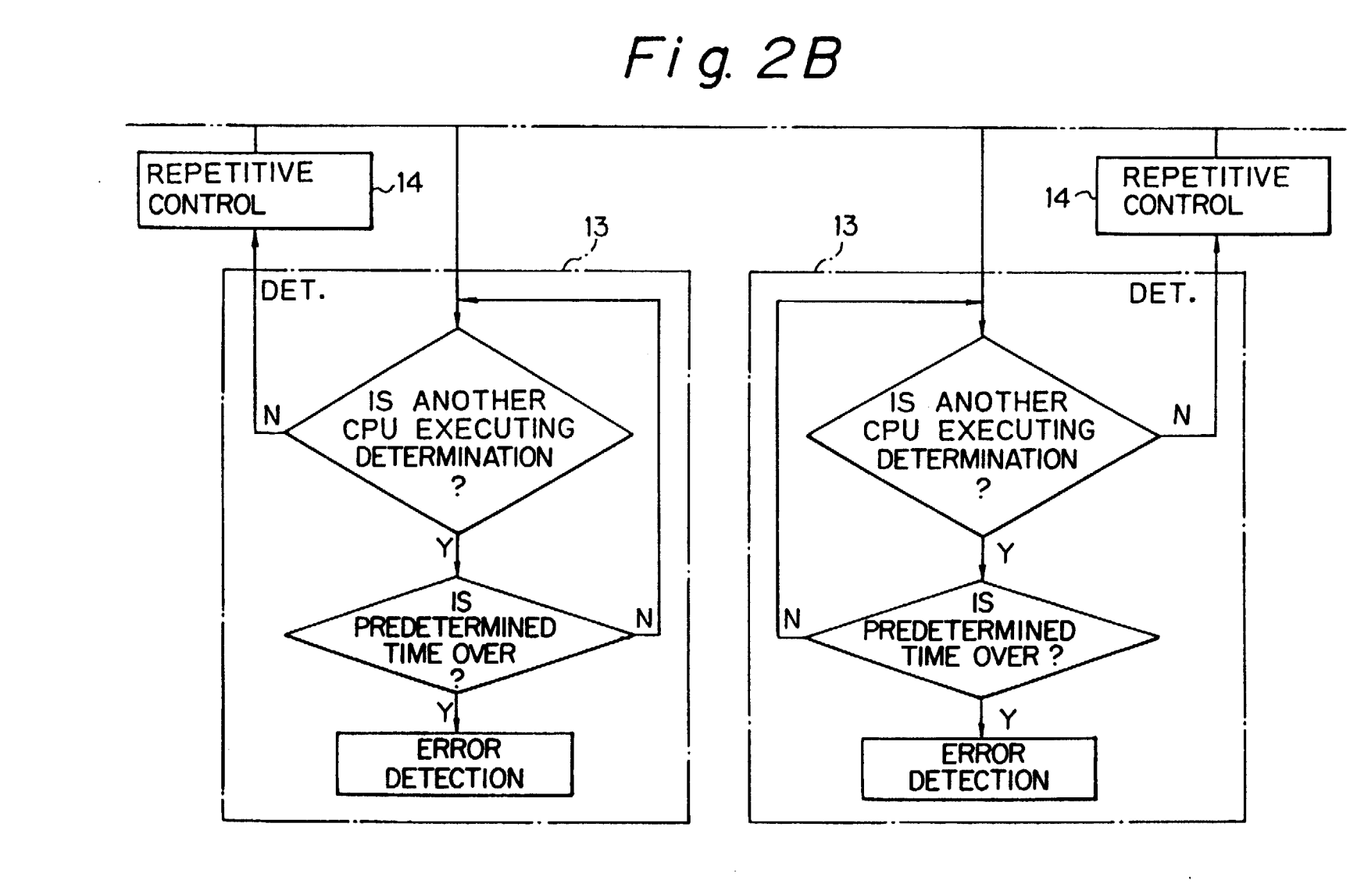

FIGS. 2A and 2B illustrate flow charts representing the fundamental approach to the serializing function verification according to the present invention. Note, the illustrated flow shows an application to a duplex system including two CPUs 1a and 1b (see FIG. 3).

Each of the CPUs 1a and 1b includes a synchronization unit 10, a random delay unit 11, an instruction execution unit 12, a detection unit 13 and a repetitive control unit 14, and executes each processing for the serializing function verification.

In the flow of FIGS. 2A and 2B, the synchronization unit 10 first synchronizes a running or execution status of its own CPU (1a) with a running or execution status of another CPU (1b) and the random delay unit 11 then delays an initiation of a next execution at random.

Next, the instruction execution unit 12 executes a serializing instruction, which indicates a set of data read and write processings, to read a first area set for its own CPU and write a given data in the first area. Note, the status in which data is written in an area is referred to as "flag-ON" and the inverse status is referred to as "flag-OFF".

The instruction execution unit 12 then reads a second area set for the other CPU to determine whether the second area is "flag-ON" or not. If the result is "flag-OFF", the unit 12 repeats the reading and determination of the second area until "flag-ON" is confirmed.

In this case, assume that a reading of the object area of the serializing instruction executed by its own CPU (1a) conflicts with an execution of the serializing instruction by the other CPU (1b). Where the serializing function normally works, the reading is inhibited and a corresponding data in an internal memory (LBS 5a, 5b) is invalidated based on the "flag-ON". Accordingly, access to a common memory (7) is carried out after the execution of the serializing instruction and thus the "flag-ON" can be confirmed.

On the other hand, where the serializing function does not work normally, the reading is not inhibited. For example, when the reading is carried out at a timing of "flag-OFF", the "flag-OFF" is stored in the corresponding internal memory. Accordingly, even if access to the second area is carried out, a write status of the second area is read from the internal memory and indicates the "flag-OFF". In this case, the reading and determination of the second area is repeated until the "flag-ON" is confirmed.

When the "flag-ON" is confirmed, the processing by the instruction execution unit 12 is completed. Next, the detection unit 13 monitors the execution status of the other CPU (1b) and, where the other CPU is still executing the determination operation after a lapse of predetermined time, the detection unit detects an "error" to indicate occurrence of the error for the operator.

When both of the CPUs normally function, the repetitive control unit 14 initializes the respective internal memory and the common memory to control repetition of each processing from the synchronizing processing (10).

As explained above, the instruction execution unit 12 has a function of executing a serializing instruction issued from its own CPU and reading a flag setting status based on a serializing instruction issued from and executed by the other CPU, and the execution timing of the unit 12 is changed at random by the random delay unit 11 and repeatedly by the repetitive control unit 14. Therefore, by executing a series of processings (10) to (14) many times, it is possible to verify the serializing function at various combinations of timings.

Figure 3:
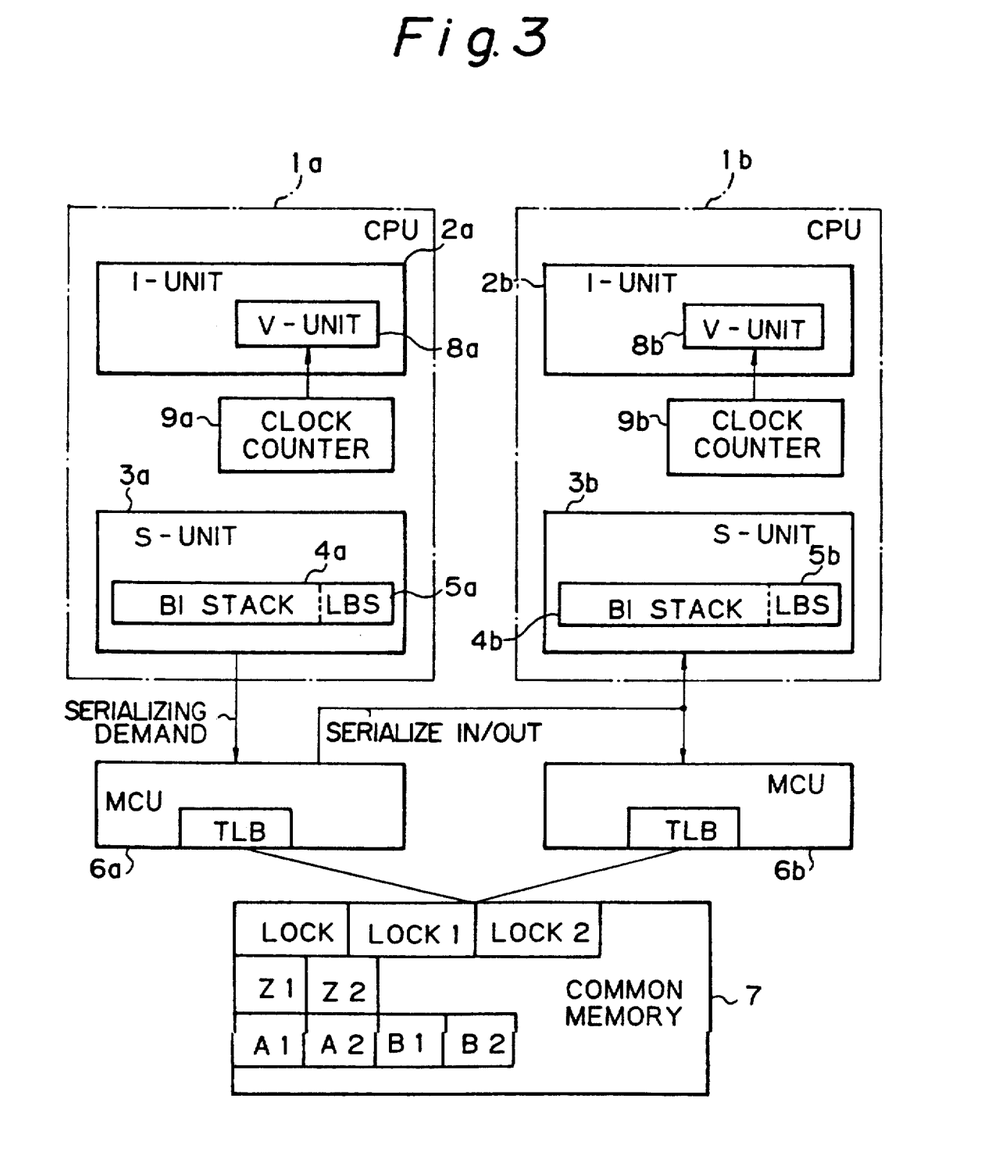
FIG. 3 is a block diagram illustrating a constitution of the multi-CPU system as an embodiment of the present invention.

FIG. 3 illustrates a constitution of the multi-CPU system as an embodiment of the present invention.

The illustration shows a duplex system similar to the constitution shown in FIG. 1. The CPUs 1a, 1b, I-UNITs 2a, 2b, S-UNITs 3a, 3b, BI STACKs 4a, 4b, LBSs 5a, 5b, MCUs 6a, 6b and a common memory 7 are equivalent to the constituent elements 1A, 1B, 2A, 2B, 3A, 3B, 4A, 4B, 5A, 5B, 6A, 6B and 7C in FIG. 1, respectively, and thus the explanation thereof is omitted.

References 8a, 8b denote verification units (V-UNITs) or processings composed of programs, characterizing the present invention. In the verification, the programs are loaded into the CPUs 1a and 1b, respectively, and executed.

References 9a, 9b denote clock counters constituted by a plurality of bits, each recurrently counting clocks for its own CPU. Also, the common memory 7 includes areas for use of the verification and references LOCK, LOCK1, LOCK2, Z1, Z2, A1, A2, B1 and B2 indicate addresses corresponding to the areas, respectively. Note, the MCUs 6a and 6b include translation lookaside buffers (TLBs), respectively, which are provided for convenience of the direct access to the common memory 7 by the S-UNITs 3a, 3b, as described later.

Each of the V-UNITs 8a, 8b is constituted by the synchronization unit 10, random delay unit 11, instruction execution unit 12, detection unit 13 and repetitive control unit 14, performing the functions shown in FIGS. 2A, as previously explained. Each V-UNIT 2B, and carries out the verifying operations, e.g., one million times, at different timings. In this case, when the verifying operations are completed without detection of errors, the serializing function in the system is judged as "normal".

Figures 4, 4A:
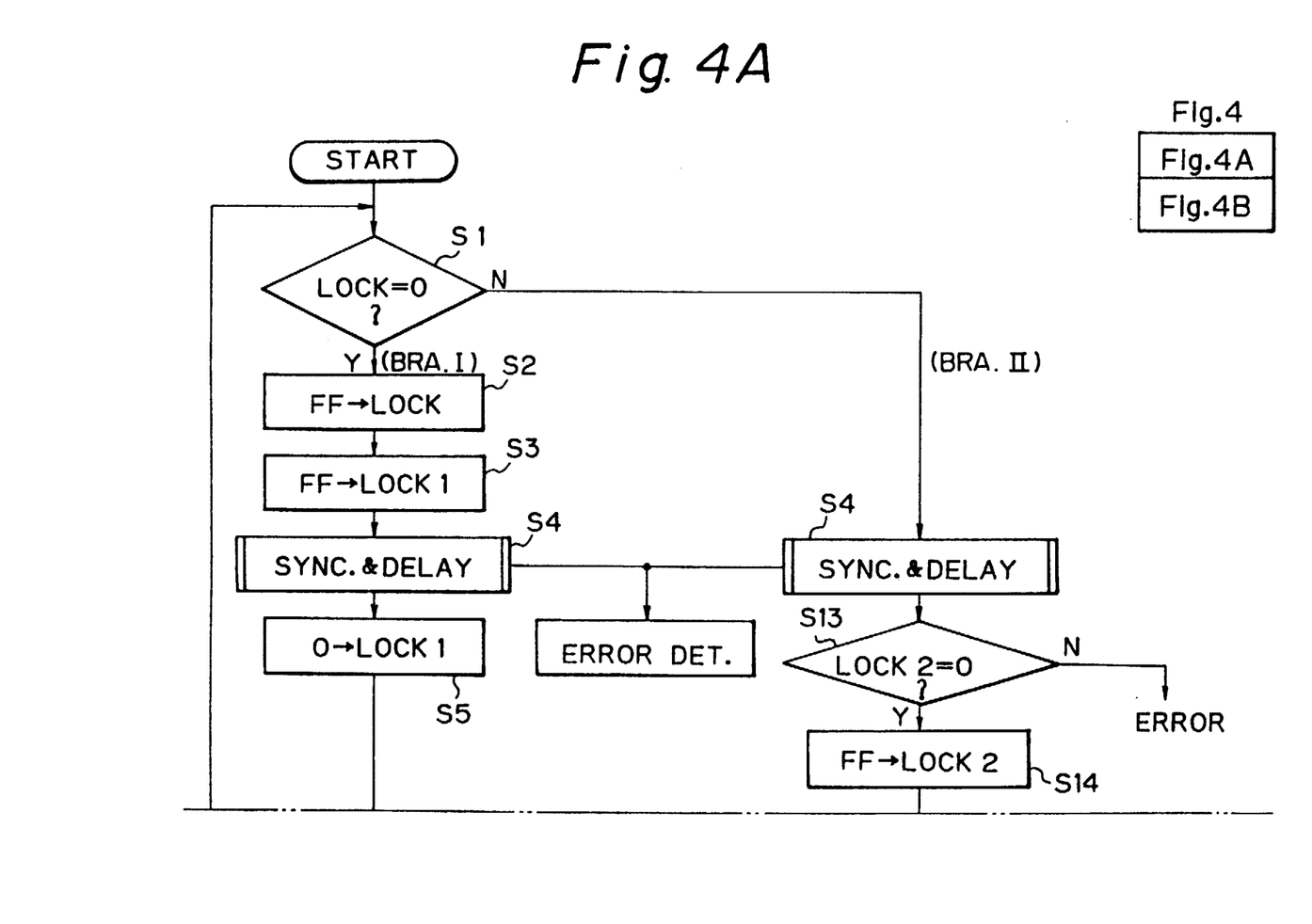
FIGS. 4A and 4B are flow charts for explaining the verifying operation in the system shown in FIG. 3.
Figure 4B:
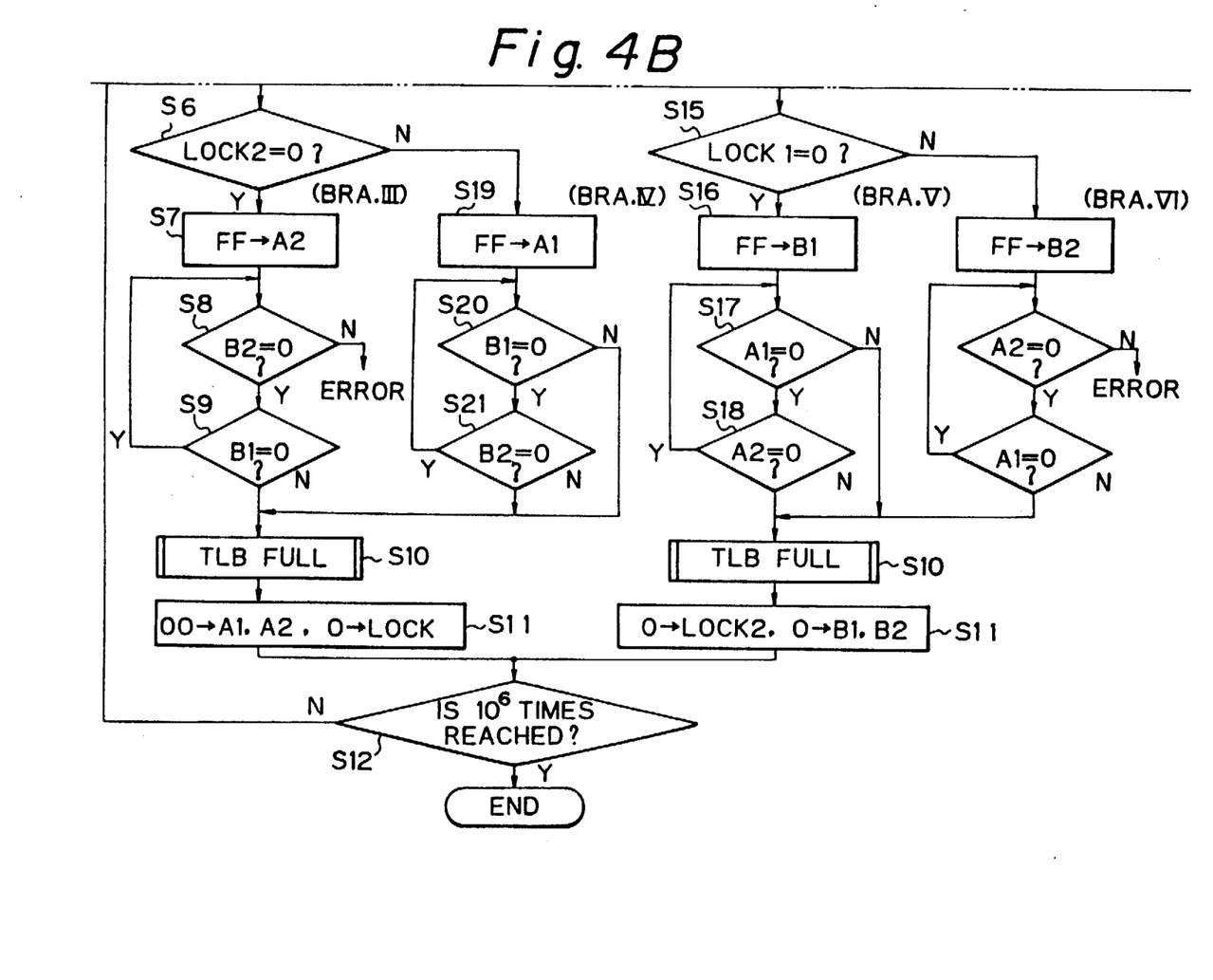
Figure 5:
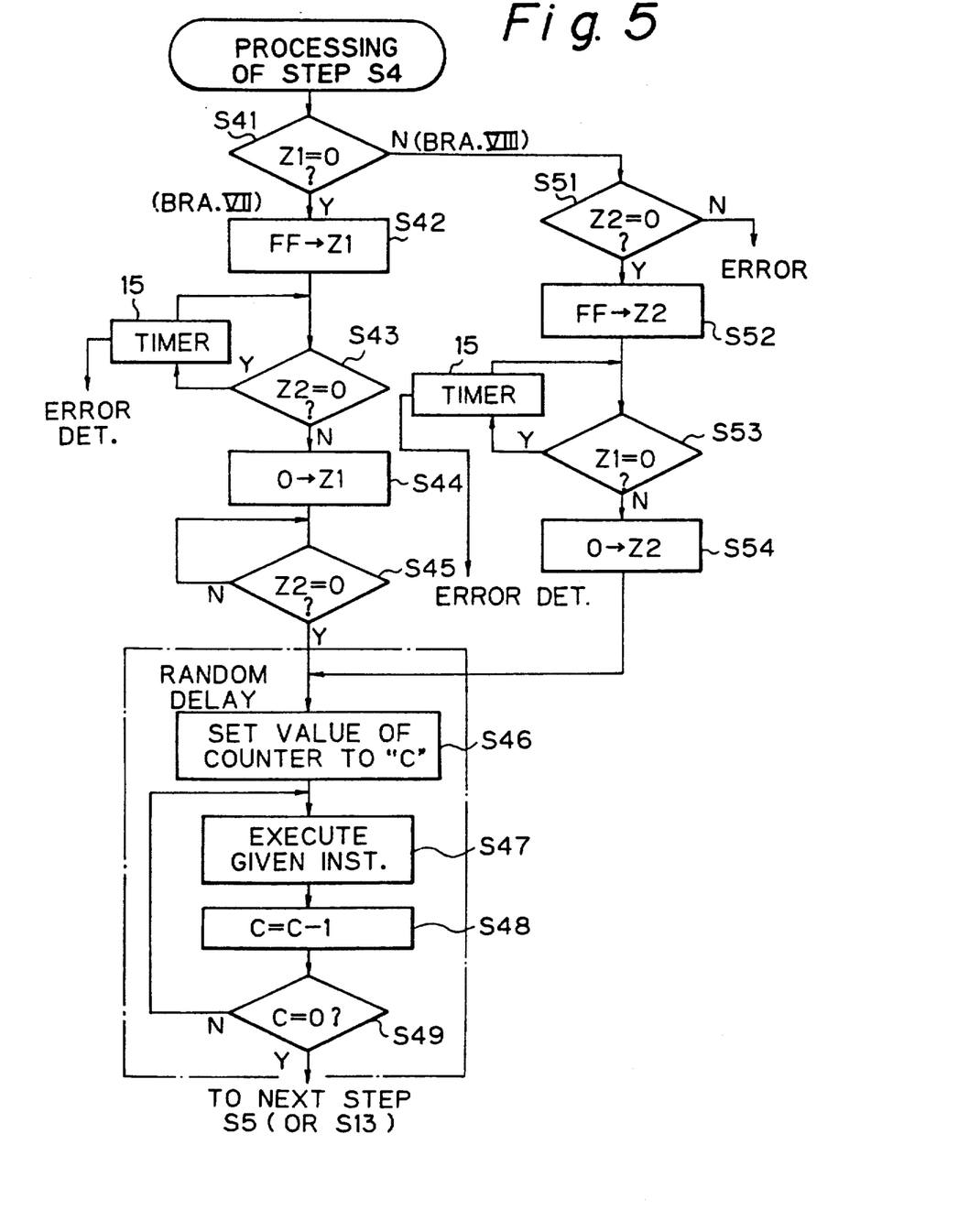
FIG. 5 is a flow chart representing the synchronization and random delay processings shown in FIG. 4A.

FIGS. 4A, 4B and 5 show a verifying operation executed by the V-UNITs 8a and 8b which is different from that shown in FIGS. 2A and 2B in the following points:

①  The synchronization unit 10 is provided with a timer 15 (corresponding to part of the function of the detection unit 13) and, where time required for the synchronization is over, effects a judgement of "error" to indicate occurrence of the error for the operator.

②  The instruction execution unit 12 is provided with a unit (corresponding to part of the function of the detection unit 13) for monitoring a running or execution status of another CPU and executes instructions according to running intervals between its own CPU and the other CPU.

Next, the verifying operation by the V-UNITs 8a, 8b will be explained with reference to FIGS. 4A, 4B and 5.

Note, in the initialization processing (step S10), the internal memories (LBSs) 5a and 5b are filled with of data other than data corresponding to the areas for use of the verification. This contributes to the convenience of the direct access to the common memory 7 by the S-UNITs 3a, 3b.

First, at step S1, it is determined of whether a specific address LOCK is set to "0" (Y) or not (N). If the result is "Y", the control proceeds to step S2. In this case, the one CPU which started the execution earlier than the other CPU executes branch $_I$. On the other hand, if the result of step S1 is "N", the control proceeds to step S4. In this case, the other CPU which started the execution later executes branch $_{II}$.

Assume, that the CPU 1a started the execution prior to the CPU 1b. Accordingly, the CPU 1a sets the address LOCK to "FF" at step S2 and sets another address LOCK1 to "FF" at step S3. As for the CPU 1b starting the execution later, since the address LOCK is equal to "FF" at step S1, the CPU 1b executes branch $_{II}$.

(1) Synchronization

Referring to FIG. 5, at step S41, it is determined whether a specific address Z1 is set to "0" (Y) or not (N). If the result is "Y", the control proceeds to step S42. In this case, the CPU 1a starting the execution earlier executes branch $_{VII}$. On the other hand, if the result of step S41 is "N", the control proceeds to step S51. In this case, the other CPU 1b executes branch $_{VIII}$. At step S51, the CPU 1b determines whether a specific address Z2 is set to "0" (Y) or not (N). If the result is "Y", the control proceeds to step S52 and, if the result is "N", the control indicates occurrence of "error" for the operator.

At step S42 (S52), the CPU 1a (1b) sets the address Z1 (Z2) to "FF". At next step S43 (S53), the CPU 1a (1b) determines whether the address Z2 (Z1) is set to "0" (Y) or not (N). If the result is "N", the control proceeds to step S44 (S54) and sets the address Z1 (Z2) to "0". On the other hand, if the result of step S43 (S53) is "Y", the CPU 1a (1b) determines whether a predetermined time required for the setting of the other CPU 1b (1a) is over or not, by means of the timer 15 provided therein. Where the predetermined time elapses, the control effects a judgement of "error" to indicate occurrence of the error for the operator.

At step S45, the CPU 1a determines whether the address Z2 is set to "0" (Y) or not (N). If the result is "Y", the control proceeds to step S46 and, if the result is "N", the control stands by until the address Z2 is set to "0".

Namely, in the synchronization processing, the one CPU 1a (1b) monitors the setting status of the other CPU 1b (1a) by means of the timer 15 and stands by until the other CPU is brought to its setting state. By this processing, the CPUs 1a, 1b can proceed to the next step (random delay) in synchronization with each other.

(2) Random delay

The CPU 1a (1b) sets a value of the counter 9a (9b) to a predetermined value "C" at step S46, and executes a given instruction at step S47. At step S48, the CPU 1a (1b) subtracts "1" from the set value "C" of the counter 9a (9b) every time the instruction is executed one by one. At step S49, the CPU 1a (1b) determines whether the value "C" is equal to "0" (Y) or not (N). If the result is "Y", the control proceeds to next step S5 (S13) and, if the result is "N", the control returns to step S47.

Namely, the CPU 1a (1b) reads the set value of the corresponding counter 9a (9b) and, after execution of instructions of the number corresponding to the set value, proceeds to the next step.

(3) Execution of Instructions

At step S5, the CPU 1a sets the address LOCK1 to "0". On the other hand, at step S13, the CPU 1b determines whether a specific address LOCK2 is set to "0" (Y) or not (N). If the result is "Y", the control proceeds to step S14 and, if the result is "N", the control indicates occurrence of "error" for the operator. At step S14, the CPU 1b sets the address LOCK2 to "FF". The one CPU 1a (1b) monitors the execution status of the other CPU 1b (1a) at step S6 (step S15).

Where the processing of step S6 is executed earlier than that of step S15, i.e., where the CPU 1a is running earlier than the CPU 1b, the address LOCK1 is equal to "0" at step S15, so that the CPU 1b executes branch $V$. On the other hand, the CPU 1a executes branch $III$ or $IV$ based on a timing at which the address LOCK2 is set to "FF".

In the same manner, where the CPU 1b is running earlier than the CPU 1a, the address LOCK2 is equal to "FF" at step S6, so that the CPU 1a executes branch $IV$. On the other hand, the CPU 1b executes branch $V$ or $VI$ based on a timing at which the address LOCK1 is set to "0".

Assuming that the CPU 1a executes branch $III$ and the CPU 1b executes branch $V$.

At step S7, the CPU 1a issues a TS instruction (serializing instruction) and brings an address A2 to a flag-ON state, i.e., sets the address A2 to "FF". Next, at step S8, the CPU 1a reads an address B2 (from the common memory 7) and determines whether the address B2 is set to "0" (Y) or not (N). If the result is "Y", the control proceeds to step S9 and, if the result is "N", the control indicates occurrence of "error" for the operator. At step S9, the CPU 1a reads an address B1 and judges whether the address B1 is set to "0" (Y) or not (N). If the result is "N", the control proceeds to step S10 and, if the result is "Y", the control returns to step S8.

In the same manner, at step S16, the CPU 1b issues a TS instruction and sets the address B1 to "FF". Next, at step S17, the CPU 1b reads an address A1 and determines whether the address A1 is set to "0" (Y) or not (N). If the result is "Y", the control proceeds to step S18 and, if the result is "N", the control jumps to step S10. At step S18, the CPU 1b reads the address A2 and determines whether the address A2 is set to "0" (Y) or not (N). If the result is "N", the control proceeds to step S10 and, if the result is "Y", the control returns to step S17.

In the above operation, since the CPU 1b is running later than the CPU 1a, a possibility occurs in that the reading of the address B1 by the CPU 1a (step S9) competes with the execution of the TS instruction by the CPU 1b (step S16). This possibility, however, can be excluded in the following manner.

The CPU 1a reads the address B1 at a timing the address B1 is equal to "0" and stores the read address in the internal memory (LBS) 5a. Therefore, if the serializing function does not work normally, a next read operation is not inhibited and data corresponding to the address B1 is not invalidated. As a result, the CPU 1a repeatedly reads the address B1 from the internal memory (LBS) 5a and thus repeats the processings of steps S8 and S9 (loop operation).

On the other hand, even if the CPU 1a completes the processing of step S7, the CPU 1b repeats the processings of steps S17 and S18 (loop operation) where the reading by the CPU 1a is not released from its inhibition.

However, since a probability in the two loop operations being simultaneously carried out is extremely low, one of the CPUs 1a, 1b completes the corresponding loop operation earlier and proceeds to next step S10.

(4) Repetitive control

At step S10, the internal memories (LBSs) 5a and 5b are filled with data other than data corresponding to the areas for use of the verification. This initialization processing is carried out by reading successive addresses with units of a page from the buffers (TLBs) within the MCUs 6a, 6b. By this processing, it is possible to cause the CPUs 1a and 1b to directly take access to the common memory 7.

After execution of the initialization processing, at step S11, the CPU 1a (1b) clears each of the addresses A1, A2 and LOCK (B1, B2 and LOCK2) set to "FF". At next step S12, the CPU 1a (1b) determines whether the verifying operation is carried out one million times (Y) or not (N). If the result is "Y", the control comes to an "END" and, if the result is "N", the control returns to step S1 and the CPU 1a (1b) executes the synchronization processing.

(5) Detection

Where one of the CPUs 1a and 1b carries out the above loop operation during the execution of instructions, it cannot execute its synchronization processing even after a lapse of predetermined time. In this case, the one CPU which executed the synchronization processing earlier than the other CPU executes branch $VII$ (see FIG. 5) and stands by until the address Z2 is set to "1".

The stand-by time is measured by the timer 15 and, where the address Z2 is not set to "1" even after the lapse of the predetermined time, the control effects a judgement of "error" to indicate occurrence of the error for the operator.

Assuming that the CPU 1a executes branch $IV$ and the CPU 1b executes branch $V$.

In this case, when the reading of the address B1 by the CPU 1a (step S20) competes with the execution of the TS instruction by the CPU 1b (step S16) and the serializing function does not work normally, the CPU 1a repeats the processings of steps S20 and S21 (loop operation). On the other hand, even if the CPU 1a completes the processing of step S19, the CPU 1b repeats the processings of steps S17 and S18 (loop operation)

where the reading by the CPU 1a is not released from its inhibition.

Note, the operation in the case that the CPU 1b is running earlier than the CPU 1a is the same as that in the inverse case and thus the explanation thereof is omitted.

In the above operation, when neither the CPU 1a nor the CPU 1b carries out the loop operation, it is possible to cause the CPUs 1a and 1b to again execute the verification operation. Therefore, by repeatedly executing the verification operation, for example, one million times (step S12), it is possible to verify the serializing function at various timings.

Namely, according to the present embodiment, the timing of the initiation of "Execution of Instructions" (step S5, S13) is changed at random by the random delay processing (steps S46 to S49) and repeatedly by the repetitive control processing (steps S10 to S12). Accordingly, by the repetition of "one million times", it is possible to verify the serializing function at various combinations of timings and thus satisfactorily ensure normality of the serializing function.

Also, since each CPU in the duplex system of the present embodiment is provided with the serializing function verification unit composed of the program defining the processings shown in FIGS. 4A, 4B and 5, it is possible to verify the normality of the serializing function in a short time. Furthermore, when a fault occurs in the entire system, it is possible to easily specify whether cause for the fault is due to the serializing function or not.

Although the present invention has been disclosed and described by way of one embodiment, it is apparent to those skilled in the art that other embodiments and modifications of the present invention are possible without departing from the spirit or essential features thereof.

What is claimed:

1. A method for verifying a serializing function in a system having a plurality of processors in which data from predetermined areas in a common storage are transferred to an internal storage provided in a first processor and the data is accessed by the plurality of processors, said method comprising the steps of:
   (a) synchronizing, in the first processor, an execution status of the processor with an execution status of a second processor;
   (b) delaying execution in the first processor for a predetermined changeable period selected at random by the first processor;
   (c) issuing and executing a serializing instruction in the first processor indicating a set of data read and write processings; and
   (d) verifying whether the serializing instruction in the first processor is executed without an error indication.

2. A method as set forth in claim 1 further comprising the step of (e) initializing the internal storage in the first processor and the common storage to control repetition of each step starting from step (a), whereby the timing of the execution of said serializing instruction is controlled repeatedly between each processor.

3. A method as set forth in claim 2, wherein step (c) comprises the steps of (c1) executing said serializing instruction to read a first area set for the first processor and write a given data in the first area, (c2) reading a second area set for the second processor to determine a write status of data by the second processor, and (c3) repeatedly reading the second area to determine the write status where the second area is not in the write status, and step (d) comprises the steps of (d1) monitoring the execution status of the second processor and d(2) indicating occurrence of an error when the second processor is still executing step (c3) after a lapse of predetermined time.

4. A method as set forth in claim 3, wherein step (e) includes the step of filling the internal storage in the first processor with data other than data corresponding to areas for use of verification of the serializing function.

5. A method for verifying a serializing function in a system having a plurality of processors in which data from predetermined areas in a common storage are transferred to an internal storage provided in a first processor and the data is accessed by the plurality of processors, said method verifying proper execution of the serializing function of inhibiting access to the data by a second processor during execution of a serializing instruction indicating a set of data read and write processings, said method comprising the steps of:
   (a) synchronizing, in the first processor, an execution status of the processor with an execution status of another processor;
   (b) delaying execution in the first processor for a predetermined changeable period selected at random by the first processor;
   (c) executing said serializing instruction in the first processor to read a first area set for the first processor and write a given data in the first area, then reading a second area set for the second processor to determine a write status of data by the second processor, and repeatedly reading the second area to determine the write status where the second area is in a nonwrite status;
   (d) monitoring the execution status of the second processor and, where the second processor is still reading the second area in step (c) after a lapse of predetermined time, indicating occurrence of an error; and
   (e) initializing the internal storage and the common storage to control repetition of each step from said synchronizing step (a).

6. A test system including a plurality of processors for verifying a serializing function, in which data of predetermined areas in a common storage are transferred to an internal storage provided in a first processor and the data is accessed by the plurality of processors, each processor comprising:
   synchronizing means for synchronizing an execution status of the first processor with an execution status of a second processor;
   delay means for delaying execution by the first processor for a predetermined changeable period selected at random after completion of said synchronizing processing by said synchronizing means;
   serializing means for issuing and executing a serializing instruction indicating a set of data read and write processings after the delaying by said delay means is completed; and
   verifying means for verifying whether the serializing instruction executed by said synchronizing means is executed without an error indication.

7. A test system as set forth in claim 6, further comprising initializing means for initializing the internal storage and the common storage.

8. A test system as set forth in claim 7, wherein the serializing means comprises means for executing said serializing instruction after completion of said delaying processing to read a first area set for the first processor and write a given data in the first area, then reading a second area set for the second processor to determine a write status of data by the second processor, and repeatedly reading the second area to determine the write status where the second area is in a nonwrite status, and the verifying means comprises means for monitoring the execution status of the second processor and indicating occurrence of an error when the second processor is still reading the second area after a lapse of predetermined time.

9. A test system as set forth in claim 8, wherein the initializing means includes means for filling the internal storage with data other than data corresponding to areas for use of verification of the serializing function.

10. A test system having a plurality of processors in which data of predetermined areas in a common storage are transferred to an internal storage provided in a first processor the data is accessed by the plurality of processors, said test system verifying normality of a serializing function of inhibiting access to the data by a second processor during execution of a serializing instruction indicating a set of data read and write processings, said processor comprising:

synchronizing means for synchronizing an execution status of the first processor with an execution status of the second processor;

delay means for delaying execution by the first processor for a predetermined changeable period selected at random after completion of processing by said synchronizing means;

serializing means for executing said serializing instruction after completion of said delaying means to read a first area set for the first processor and write a given data in the first area, reading a second area set for the second processor to determine a write status of data by the second processor, and repeatedly reading the second area to determine the write status where the second area is in a nonwrite status;

error detection means for monitoring an execution status of the second processor and, where the second processor is still reading the second area to determine the write status after a lapse of predetermined time, indicating occurrence of an error; and initializing means for initializing the internal storage and the common storage to control repetition of each processing from the synchronizing initially performed by said synchronizing means.

11. A method of verifying, in a first processor, serialization of access to a common storage in a multiprocessor system, comprising the steps of:
  (a) synchronizing execution of the first processor with execution of a second processor;
  (b) delaying execution by the first processor of a serializing instruction by a randomly variable amount of time;
  (c) executing the serializing instruction in the first processor;
  (d) verifying that serialization was obtained by the serializing instruction; and
  (e) repeating steps (a) through (e) so that step (b) delays execution by different amounts of time.

12. A test system for verifying serialization of access to a common storage in a multiprocessor system, said test system comprising:

a plurality of processors, a first processor comprising:

synchronizing means for synchronizing execution of the first processor with execution of a second processor;

delay means for delaying, after synchronization by said synchronization means, execution by the first processor of a serializing instruction by a randomly variable amount of time;

serializing means for executing the serializing instruction in the first processor after the delaying of execution by said delay means;

verifying means for verifying serializing by the serializing instruction executed by said serializing means; and repeat means for repeating the processing performed by said synchronizing means, said delay means, said serializing means, and said verifying means so that said delay means delays execution by different amounts of time.

* * * * *